US007991075B2

United States Patent
Lanoiselee et al.

(10) Patent No.: US 7,991,075 B2
(45) Date of Patent: Aug. 2, 2011

(54) RADIO BROADCASTING METHOD AND TRANSMITTER USING PRE-FILTERING AND CORRESPONDING SIGNAL

(75) Inventors: Marc Lanoiselee, Rennes (FR); Pierrick Louin, Rennes (FR)

(73) Assignee: TDF, Paris Cedex (FR)

( * ) Notice: Subject to any disclaimer, the term of this patent is extended or adjusted under 35 U.S.C. 154(b) by 1073 days.

(21) Appl. No.: 10/558,055

(22) PCT Filed: May 25, 2004

(86) PCT No.: PCT/FR2004/001296
§ 371 (c)(1),
(2), (4) Date: Nov. 13, 2006

(87) PCT Pub. No.: WO2004/107603
PCT Pub. Date: Dec. 9, 2004

(65) Prior Publication Data
US 2007/0291865 A1    Dec. 20, 2007

(30) Foreign Application Priority Data
May 27, 2003   (FR) ...................................... 03 06448

(51) Int. Cl.
*H04H 1/00* (2006.01)
(52) U.S. Cl. .......................... 375/300; 375/268; 375/270
(58) Field of Classification Search .................. 375/300, 375/268, 296, 270; 455/108, 109
See application file for complete search history.

(56) References Cited

U.S. PATENT DOCUMENTS

| | | | |
|---|---|---|---|
| 6,005,894 A * | 12/1999 | Kumar | 375/270 |
| 6,144,705 A | 11/2000 | Papadopoulos et al. | 375/296 |
| 6,445,750 B1 * | 9/2002 | Chen et al. | 375/300 |
| 6,452,977 B1 | 9/2002 | Goldston et al. | 375/260 |
| 6,898,249 B2 * | 5/2005 | Kroeger et al. | 375/259 |
| 7,224,675 B1 * | 5/2007 | Merkle et al. | 370/330 |
| 2002/0080887 A1 | 6/2002 | Jeong et al. | 375/295 |
| 2003/0012300 A1 * | 1/2003 | Wildhagen et al. | 375/300 |
| 2004/0037305 A1 * | 2/2004 | Wildhagen et al. | 370/432 |
| 2004/0076188 A1 * | 4/2004 | Milbar et al. | 370/514 |

FOREIGN PATENT DOCUMENTS

| | | |
|---|---|---|
| DE | 101 23 150 A1 | 11/2002 |
| EP | 0 952 696 A2 | 10/1999 |
| EP | 1 276 257 A1 | 1/2003 |

OTHER PUBLICATIONS

IBOC AM Transmission Specification, Ibiquity Digital Corporation, Nov. 2001.*
Christof Faller, Biing-Hwang Juang, Peter Kroon, Hui-Ling Lou, Sean A. Ramprashad, and Carl-Erik W. Sundberg, "Technical Advances in Digital Audio Radio Broadcasting", IEEE Aug. 2002.*

(Continued)

*Primary Examiner* — Chieh M Fan
*Assistant Examiner* — Aristocratis Fotakis
(74) *Attorney, Agent, or Firm* — David D. Brush; Westman, Champlin & Kelly, P.A.

(57) ABSTRACT

The disclosure relates to a radio broadcasting method for a first multicarrier digital signal occupying a first frequency band adjacent to at least one second frequency band, each assigned to a second signal. Pre-filtering is applied to the said first signal before its emission so as to attenuate the power of the said first signal in at least a first portion of the said first frequency band, adjacent to the said second frequency band (s).

19 Claims, 4 Drawing Sheets

OTHER PUBLICATIONS

ETSI TS 101 980 V1.1.1, Digital Radio Mondiale (DRM),System Specification, Sep. 2001.*

Jonathan Stott, "DRM-key technical features", BBC Research & Development, Mar. 2001.*

Translation of International Preliminary Report on Patentability and Written Opinion, dated Oct. 21, 2005 for corresponding International Application No. PCT/FR2004/001296, filed May 25, 2004.

* cited by examiner

RADIO BROADCASTING METHOD AND TRANSMITTER USING PRE-FILTERING AND CORRESPONDING SIGNAL

CROSS-REFERENCE TO RELATED APPLICATION

This Application is a Section 371 National Stage Application of International Application No. PCT/FR2004/001296, filed May 25, 2004 and published as WO2004/107603A2 on Dec. 9, 2004, not in English.

FIELD

The domain of the disclosure is digital radio broadcasting. More precisely, the disclosure relates to broadcasting of multicarrier digital signals that could disturb signals transmitted in adjacent frequency bands.

BACKGROUND

Thus, one particular application field of the invention is resource sharing in frequency bands currently used in AM (Amplitude Modulation) emissions, in other words at long waves from 153 to 279 kHz, medium waves from 520 to 2500 kHz and short waves from 3.1 to 26.1 MHz. It is intended to gradually replace analogue services that are becoming less popular by much better quality digital services in order to revitalise listening to the radio in these frequency bands.

Thus, a digital radio broadcasting standard was defined and validated at the ETSI in September 2001, within the context of the DRM ("Digital Radio Mondiale") project in which the holders of this patent application are participating. In this system, it is planned to transmit a radiophone service using compression, encoding and digital modulation techniques so that the signal characteristics can be better adapted to channel constraints in these frequency bands.

The transmission technique used is the COFDM already used in DAB (Digital Audio Broadcasting) and DVB-T (Digital Video Broadcasting-Terrestrial) standards.

In a transient phase for introduction of the DRM system, consortium partners and particularly broadcasting organisations would like to assure continuity of the existing AM service and implement simultaneous emissions combining a digital signal and a classical analogue AM signal that broadcast identical programs ("simulcast" technique).

In particular, it is planned to associated these two emissions by placing them in distinct channels at adjacent frequencies in the radio frequency spectrum.

Figure 1:
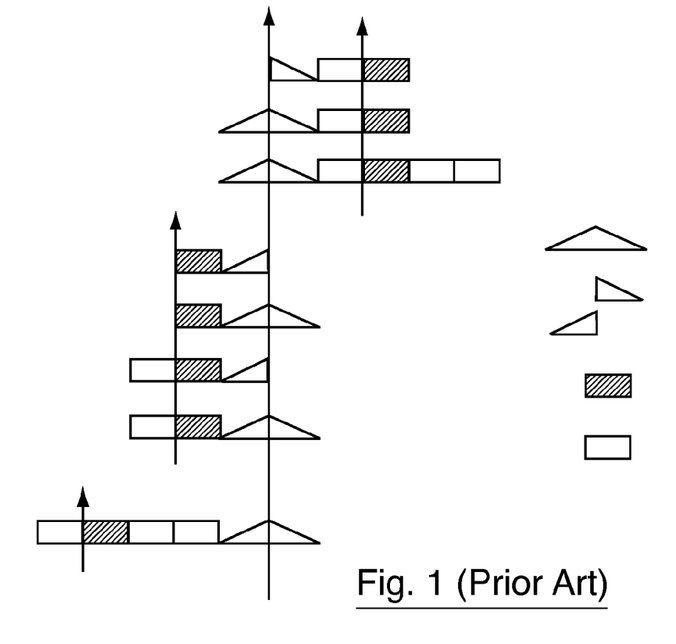
FIG. 1 illustrates different "simulcast" transmission modes proposed by ETSI standard DRM ES 201 980 V 1.2.

As planned by the DRM standardisation consortium, the principle of the "simulcast" mode combines an AM analogue emission and a DRM digital emission placed in contiguous channels in the frequency spectrum according to different possible configurations as shown in FIG. 1.

In this Figure, the AM signal is represented by a triangle and the DRM signal is represented by a rectangle. The digital and analogue channels can occupy a variable passband that is a multiple of 4.5 kHz for medium waves and 5 kHz for short waves. They are adjacent in all cases.

This approach is suitable for the digital signal, for which reception can be assured efficiently. On the other hand, it raises problems with classical AM receivers, and particularly low range AM receivers for use by the general public that account for a large proportion of all receivers.

These receivers usually have poor selectivity and amplitude-frequency response performances.

Figure 2:
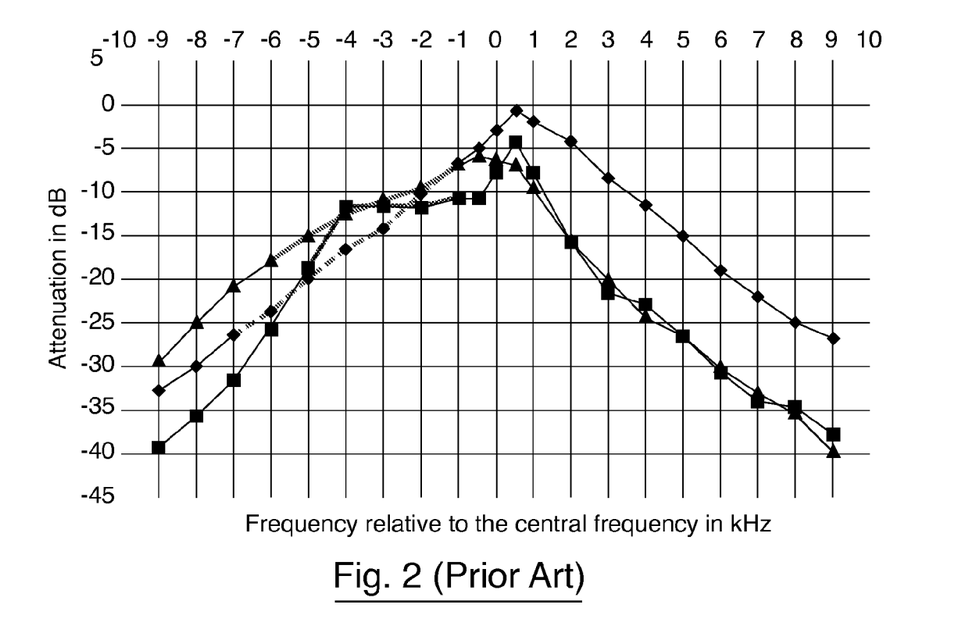
FIG. 2 shows the amplitude-frequency response of three commercially available medium wave AM receivers.

As can be seen in FIG. 2, that shows selectivity groups for three different medium waves (MW) AM receivers with a spacing of less than 9 kHz between channels. It can be seen that these responses are not linear and go well beyond the limits of the AM channel, which is +/−4.5 kHz with respect to the central frequency Fc of the channel in medium wave.

Figure 3A:
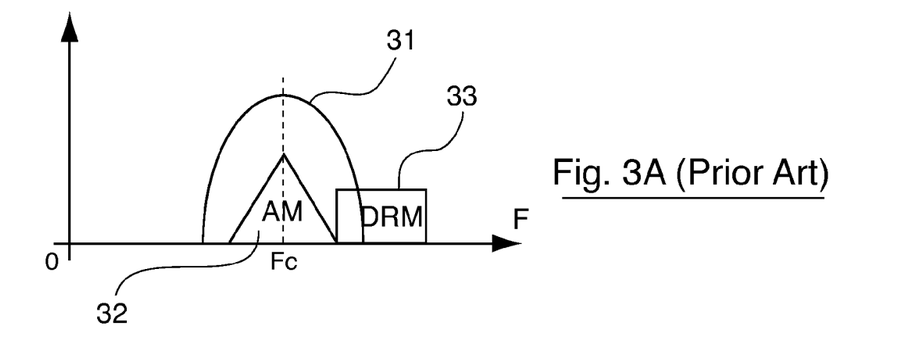
Figure 3B:
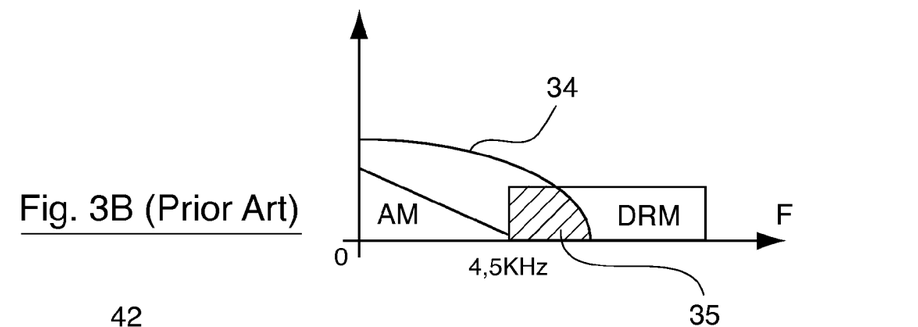

As can be seen in FIGS. 3a and 3b, this passband 31 which is too wide in radio frequency, encompasses not only the AM signal 32, but also a variable sized portion of the adjacent digital channel 33.

As illustrated in FIG. 3b, the demodulated audio signal 34 contains a portion 35 of the digital signal in frequencies beyond 4.5 kHz. It is known that the ear is very sensitive at these frequencies. Thus, there is interference when listening to the audio signal.

This result is contrary to the objective fixed by the "simulcast" approach, which is to maintain the possibility for persons with a classical AM receiver to receive programs. Obviously, listeners will stop listening to these programs if they are affected by interference.

Obviously, it would be possible to attenuate interference by reducing the power level of the digital signal compared with the analogue AM signal. However in this case, the reduction in the level of the digital signal will cause a serious loss over the coverage area of the digital service.

Measurements of the protection ratio have shown that the digital signal has to be at least 16 dBc weaker than the analogue signal so as to guarantee a relatively acceptable interference level with a good proportion of low performance AM receivers. But even in this case, there are still situations in which AM reception remains severely disturbed.

Other approaches could be envisaged to simultaneously transmit the digital signal and the analogue signal. However, in all cases the digital signal will disturb the analogue signal, creating interference in low performance AM receivers.

SUMMARY

In particular, the purpose of an embodiment of the invention is to overcome these disadvantages according to prior art.

More precisely, one purpose of an embodiment of the invention is to provide a technique for transmitting a multicarrier digital signal so as to transmit at least one other adjacent signal, particularly in frequency bands varying from a few hundreds of kHz to several tens of MHz without excessively disturbing adjacent signals.

Thus, one purpose of an embodiment of the invention is to enable simultaneous transmission (simulcast) of a digital signal and a corresponding analogue AM signal such that most AM receivers and particularly low range receivers with low selectivity, can continue to receive AM signals (as if no digital signal were emitted).

In other words, the purpose of an embodiment of the invention is to achieve continuity of services for existing receivers, while enabling the development of digital receivers in adjacent frequency bands.

Another purpose of an embodiment of the invention is to provide such a technique that does not make it necessary to reduce the emission power of the digital signal and therefore its geographic range. In other words, the purpose of an embodiment of the invention is to enable a technique that does not give preference to old AM receivers to the detriment of new digital receivers.

Yet another purpose of an embodiment of the invention is to provide such a technique that does not require any adaptation in analogue receivers or digital receivers.

Another purpose of an embodiment of the invention is to supply such a technique that can be adapted to the particular conditions of an emitter, and changes to existing receivers over time.

These and other objectives that will appear more clearly in the following, are achieved in an embodiment using a radio broadcasting method for a first multicarrier digital signal occupying a first frequency band adjacent to at least a second frequency band each assigned to a second signal. Pre-filtering is applied to said first signal before the transmission thereof, so as to attenuate the power of the said first signal in at least a first portion of the said first frequency band adjacent to said second frequency band(s).

Thus, the second signal(s) is not strongly disturbed by the digital signal, even if the radio frequency filter that it uses is not very selective, for example as is the case in many existing AM receivers. The structure and the encoding of the multicarrier signal compensate for most if not all this partial signal attenuation.

Furthermore, the said pre-filtering advantageously increases the power of the said first signal in a second portion of the said first frequency band, far from the said second frequency band(s).

Therefore the improvement in the reception quality of the second signal will not take place at the detriment of the first signal. There is no need to reduce the power assigned to the first signal, and therefore its geographic range.

On the contrary, the power of the portion that is not likely to disturb the adjacent signal is increased, which enables good reception on this portion (and therefore due to decoding techniques, to compensate for the weakness of the attenuated portion) and to maintain or even increase the geographic range of the first signal.

According to one advantageous embodiment of the invention, the said second signal or at least one of the said second signals is an analogue radio broadcasting signal. In particular, it may be an amplitude modulated signal.

Advantageously, the said first signal and the said second signal or at least one of the second signals at least partly carry the same source signal. In other words, an embodiment of the invention is particularly applicable to the so-called "simulcast" technique.

Preferably, the said pre-filtering approximately keeps the power of the signal. The power may also be increased.

According to one advantageous characteristic of an embodiment of the invention, the said pre-filtering is programmable.

In this case, programming of the said pre-filtering may apply particularly to at least one of the following elements:
 filter cut-off frequency;
 power assigned to each portion of the first frequency band;
 shape of the filter template;
 filter slope in the attenuation zone(s) (roll-off).

This programming of the said pre-filtering preferably takes account of at least one of the following items of information:
 frequency band;
 characteristics of the adjacent signal(s);
 particular characteristics of an emitter;
 particular characteristics of the transmission channel;
 changes to existing receivers in time.

Advantageously, the template of the said pre-filtering comprises progressive transitions.

According to a first advantageous embodiment of the invention, the said pre-filtering is a weighting selectively applied to each of the carrier frequencies of the said multicarrier signal, before application of a mathematical transformation.

In this case, the said weighting can advantageously take account of weighting coefficients stored in an allocation table.

According to a second advantageous embodiment of the invention, the said pre-filtering is applied to the time components I and Q of the said multicarrier signal after application of a mathematical transformation.

In this case, the said pre-filtering is preferably done by a digital filter with a linear phase comprising four elementary sub-filters.

An embodiment of the invention also relates to emitters using a method like that described above. Such an emitter includes pre-filtering means of the said first signal before its emission, so as to attenuate the power of the said first signal in at least a first portion of the said first frequency band, adjacent to the said second frequency band(s).

An embodiment of the invention also relates to signals emitted according to the method described above. Such a radio broadcast multicarrier digital signal occupying a first frequency band adjacent to at least one second frequency band each assigned to a second signal, is pre-filtered so as to attenuate the power of the said first signal in at least a first portion of the said first frequency band, adjacent to the said second frequency band(s).

Other characteristics and advantages of one or more embodiments of the invention will become clearer after reading the following description of a preferred embodiment of the invention, given as a simple illustrative and non-limitative example, and the attached drawings.

BRIEF DESCRIPTION OF THE DRAWINGS

FIGS. 3a and 3b illustrate interference of an analogue signal by a digital signal resulting from poor selectively of the AM receiver:

FIG. 3a showing radio frequency;
FIG. 3b showing audio frequency;

FIGS. 4a and 4b illustrate the result of pre-filtering of the digital channel according to an embodiment of the invention, on views comparable to those in FIGS. 3a and 3b respectively:

FIG. 4a showing radio frequency;
FIG. 4b showing audio frequency;

DETAILED DESCRIPTION OF THE ILLUSTRATIVE EMBODIMENTS

An embodiment of the invention applies pre-filtering on a multicarrier digital signal before it is emitted so as to reduce the disturbance that it can introduce on reception of another adjacent signal, for example an analogue signal.

The context of this preferred embodiment is the introduction of digital radio broadcasting systems into bands currently assigned to AM (Amplitude Modulation) emissions. Thus, a digital radio broadcasting system was defined within the framework of the DRM (Digital Radio Mondiale) project for which the standard was validated at the ETSI in September 2001, and will shortly be implemented in many countries and particularly in France and in Europe.

It is planned to assure continuity of the AM service during a transient phase during which DRM will be introduced and to use "simulcast" type emissions that associate a digital signal and a classical analogue AM signal that broadcast identical programs. However, the "simulcast" solutions proposed at the moment are not satisfactory due to interference caused by the DRM component on AM when low quality AM receivers are used, and unfortunately most existing analogue receivers are low quality.

The principle proposed according to an embodiment of the invention comprises a pre-filtering of the DRM component so as to combine better protection of AM while attenuating frequencies located in the passband of analogue receivers, and a higher global DRM power than is currently planned by increasing the level outside the passband of these receivers.

Pre-filtering may be treated like a particular channel effect, pre-filtering slightly reduces system performances but operation of a standard DRM receiver is not disturbed in any other way. On the other hand, the improvement by reduction of interference to AM sets is very significant.

Note that for a user with a DRM digital receiver, the broadcasting organization guarantees conformity with the standard, but does not guarantee the transmission channel. Therefore, it is possible to apply a correction to the emission, that may be considered like a particular propagation channel and that can improve AM reception while assuring that the reduction to the DRM signal compared with the AM signal is limited.

A standard DRM receiver will still operate, except that the performance will possibly be reduced, but the reduction in performance is small and is significantly less than the improvement obtained by DRM in terms of interference and power.

It is confirmed that the immediately adjacent portion of DRM (35, FIG. 3*b*) is the portion that needs to be attenuated to prevent the appearance of medium—high frequency interference in the demodulated signal, and this is what creates a problem for the AM receiver. On the other hand, there is no reason why a higher power DRM cannot be maintained outside this immediately adjacent portion.

Figure 4A:
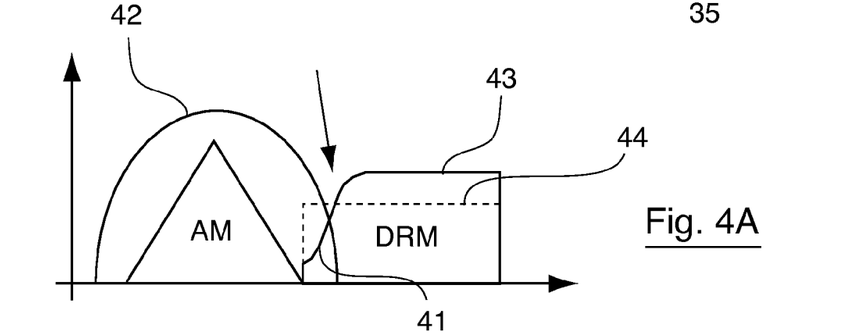

Thus, according to an embodiment of the invention and as shown in FIG. 4, a band filtering with adjustable frequency and roll-off (slope of the filter in the attenuation zone) is applied so that better protection of AM by attenuation (41) of frequencies within the passband (42) of AM receivers can be combined with a higher global DRM power (43) than is currently planned (44) by increasing the level outside the passband of AM receivers.

This higher global power can be used to increase the coverage zone or simply to compensate for degradation of performances due to filtering, when the required gain consists solely of obtaining a significant reduction in interference of AM receivers.

Figure 4B:
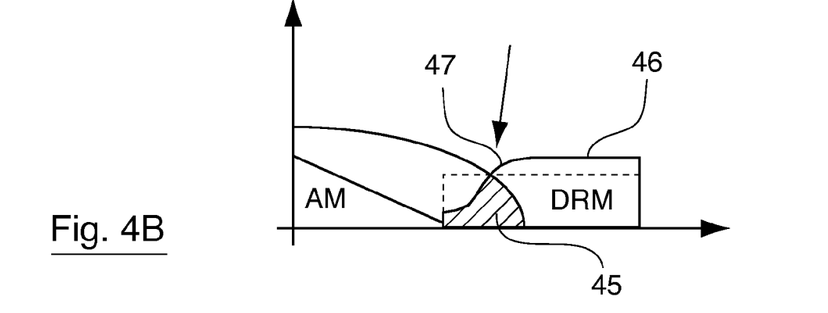

As can be seen in FIG. 4*b*, the interference zone 45 on the demodulated signal is much smaller than the interference zone 35 without the invention.

Obviously, the carrier of the digital signal 46 located in the attenuated portion (47) are received at low power, which can have an adverse effect on their demodulation. However, the principles used for such a digital signal (interlacing in time and frequency, redundancy, maximum likelihood decoding, etc.) so as make it possible to overcome this attenuation, particularly because the powers of other carriers are reinforced.

Although it is not planned in DRM, in other embodiments it is also possible to selectively distribute data on different carriers as a function of the position of these carriers. For example, signaling information and/or most significant data bits can be placed on high power carriers. Least significant bits and/or optional data or signal improvement bits (or some of these bits or data) can be placed on the attenuated carriers.

Figure 5:
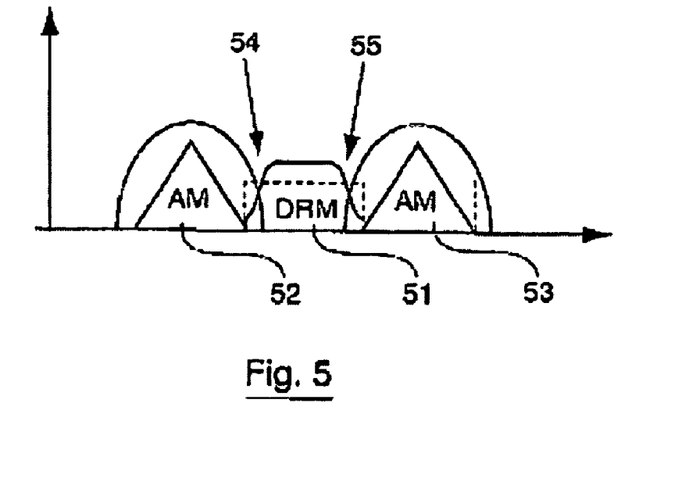
FIG. 5 illustrates an example of pre-filtering according to an embodiment of the invention in another embodiment, when the digital channel is adjacent to two analogue channels.

In the case of FIG. 5, the order of magnitude is a gain of about 6 to 12 dB on interference of the AM signal depending on the type of receiver for an equivalent noise degradation (END or DEB) equal to about 2 dB for the DRM digital signal.

The equivalent noise degradation is the reduction in performance equivalent to a given added noise level to signal. In this case, this would correspond to a reduction in the emitted power of the DRM signal equal to 2 dB, and it is observed that the significantly higher gain obtained in interference of receivers makes it possible to increase the level of the DRM signal by at least 2 dB, so as to obtain DRM performances equivalent to what would be obtained without a correction, while maintaining a very significant improvement with the problem of interference of the AM signal.

Filtering is advantageously configurable for many criteria, namely cut-off frequency, roll-off, shape of template, etc., that can be adapted particularly as a function of the required type of gain and also according to the characteristics of the channel and the broadcast.

Pre-filtering may be done in long waves, medium waves (9 kHz step) and short waves (10 kHz step). Its efficiency that determines the degradation in the performances of the DRM transmission may also be adjusted as a function of the robustness of the transmission mode as defined in the standard.

As an additional advantage, the broadcasting organization could upgrade the correction towards a solution that is more favorable to DRM, depending on the audience and the total number of receivers, without significantly modifying nominal emission powers, starting from a configuration that provides good protection for AM.

The principle of an embodiment of the invention is also applicable to cases that go beyond the "simulcast" case, in which an emission adjacent to the DRM signal on the other side of the AM component of the "simulcast" or a pure DRM emission, and which would be disturbed by the spectrum of the digital signal, are placed in the radio frequency spectrum. It would be possible to include additional weighting on the side of this channel to preserve this signal that would very probably be an AM channel.

Thus, FIG. 5 shows a DRM signal 51 adjacent to two AM channels 52 and 53 on each side and pre-filtered on each side (54, 55) in an equivalent or a different manner, so as to not disturb reception of AM analogue signals 52 and 53. However, it is important to consider that END is more important than with a single pre-filtering.

The same approach may also be used if one (or both) adjacent signals (52, 53) is (are) digital.

Figure 6:
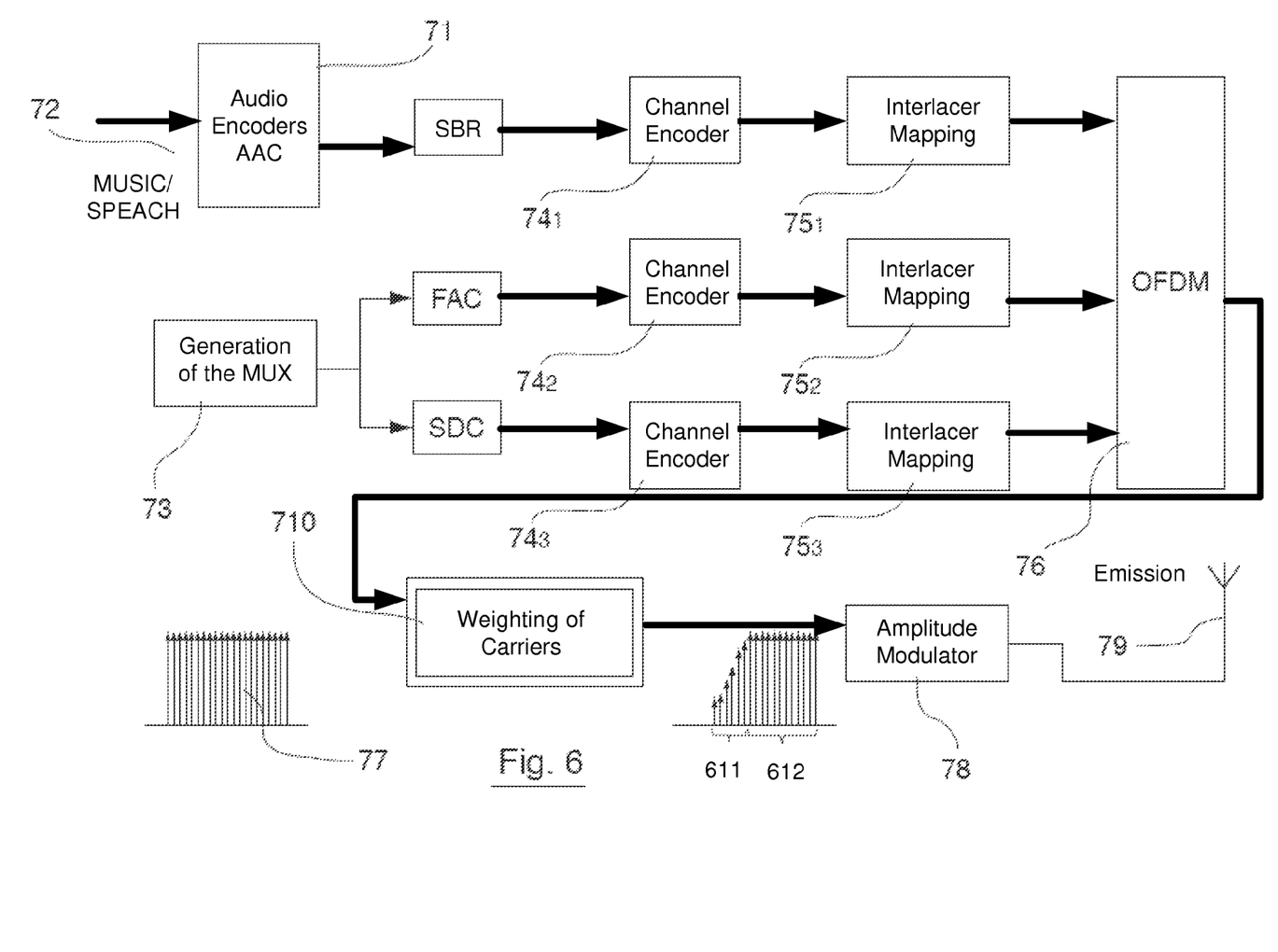
FIG. 6 shows an example emitter of a digital signal according to an embodiment of the invention presented in the form of a simplified block diagram.

We will now describe the main aspects of an emitter using an embodiment of the invention. FIG. 6 shows such an emitter in the form of a simplified block diagram.

The first encoding steps consist of reducing the speed (71) of the audio signal (72) applied to the input and building up (73) signaling information. The next steps are channel encoding steps $74_1$, $74_2$, $74_3$ interlacing in time and/or frequency $75_1$, $75_2$, $75_3$.

The OFDM signal is built (76) from a multiplex of a variable number of carriers (77) as a function of the occupied band and the robustness of the transmission mode used. An inverse FFT, converts this frequency multiplex into a time signal for two modulation components commonly called I and Q, these two components I and Q being used to enter a vector modulator (78) that transposes the base band signal into a radio frequency signal that can be emitted by an antenna (79) and broadcast.

According to an embodiment of the invention, the encoder or the emitter comprises two essential elements: firstly pre-filtering of the DRM signal to reduce the signal power at the AM signal end (611) in order to reduce the disturbance of AM receivers; and secondly by an increase in the DRM power outside the filtered zone (612) that does not disturb AM analogue receivers.

There are several possible ways of making this preliminary correction, particularly including a filter that can be placed in different locations of the emission system before the antenna.

A simple solution consists of weighting (710) the amplitude of each OFDM multiplex carrier before inverse FFT by an allocation table. Consequently, the phase of the carriers remains unchanged.

The DRM spectrum can also be weighted on time components I and Q by a digital linear phase filter that does not introduce any phase distortions, simply a delay. In this case, filtering is not real if weighting is not symmetrical about the central frequency, but is complex and require four elementary filters.

We will now give an example of pre-filtering in a special case. Note that this is an experimental result that can be improved.

A preliminary version of the pre-filtering template was thus evaluated on a DRM component in the context of a "simulcast" transmission in medium waves at 1512 kHz for AM above DRM.

The passband of the channels is 9 kHz and the DRM signal is transmitted in accordance with the standard according to mode A, with 204 carriers. This filter version can be further improved.

Figure 7:
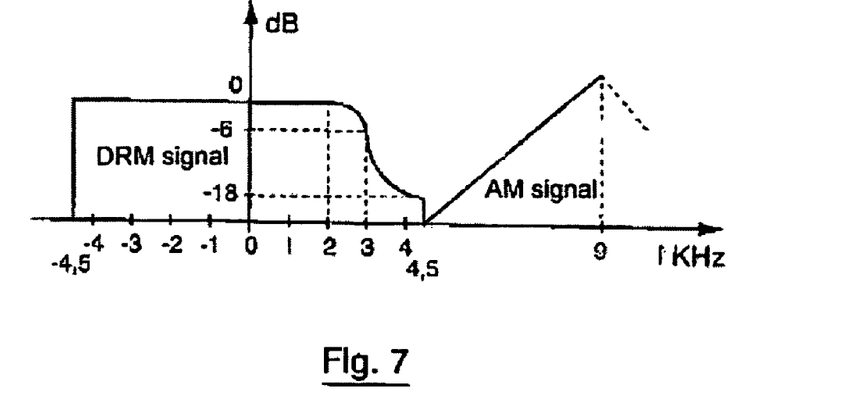
FIG. 7 contains a particular example of pre-filtering template for a digital signal according to an embodiment of the invention.

Pre-filtering of the DRM signal is conform with the template shown in FIG. 7 defined as follows where f is in kHz:

$$H(f): -4.5 < f < 2.25 \; H(f) = 0 \text{ dB}$$

$$2.25 < f < 3.0 \; H(f) = -12 \cdot \frac{1 - \cos\left(\frac{f - 2.25}{1.5}\pi\right)}{2} \text{ dB}$$

$$3.0 < f < 4.5 \; H(f) = -6 + 12\frac{3}{1.5} \cdot \frac{1 - \cos\left(\frac{f - 1.5}{3}\pi\right)}{2} \text{ dB}$$

with the following remarkable values:
at 2.25 kHz from the DRM central frequency: 0 dB
at 3.00 kHz from the DRM central frequency: −6 dB
at 3.50 kHz from the DRM central frequency: −12 dB
at 4.00 kHz from the DRM central frequency: −16 dB
at 4.50 kHz from the DRM central frequency: −18 dB The equivalent noise degradation (END) obtained on channel 1 (Gaussian channel in which the only disturbance consists of white noise) and on channel 2 (typical of a medium waves channel comprising several paths) is 2.7 dB.

Several low range AM receivers were tested:
set No. 1 (manual tuning; low range)
set No. 2 (tuning with frequency synthesis; mid-low range)
set No. 3 (manual tuning; mid-low range)
autoradio No. 4 (mid range)
autoradio No. 5 (mid range)
autoradio No. 6 (mid range)

Comparative signal to noise ratio (SNR) measurements, weighted following a curve representing the response of the ear, were made with two DRM signal configurations: with and without pre-filtering. The SNR is recorded on an electrical output: headphone output or speaker (HP) terminals, but also with a measurement microphone placed in front of a loud speaker because the passband of the amplification stage and the loud speaker sometimes tends to reduce interference of AM by DRM.

The SNR weighted in classical "simulcast" (without an embodiment of the invention) if DRM is reduced to 16 dBc lower than AM is as follows:

| | receiver: | | | | | |
|---|---|---|---|---|---|---|
| | 1 | 2 | 3 | 4 | 5 | 6 |
| headphone or HP output: | 17.5 | 10.5 | 9 | 17 | 24 | 24 |
| listening to HP with micro: | 20 | 12 | 12 | 20 | 25 | 27 |

The weighted SNR with pre-filtering and if DRM is reduced by 14 dBc (therefore which almost completely compensates the END due to pre-filtering), expressed as a gain compared with the classical solution, is as follows:

| | receiver: | | | | | |
|---|---|---|---|---|---|---|
| | 1 | 2 | 3 | 4 | 5 | 6 |
| headphone or HP output: | 4.0 | 3.0 | 4.0 | 10.5 | 10.0 | 3.0 |
| listening to HP with micro: | 6.5 | 2.0 | 4.5 | 10.0 | 8.0 | 2.5 |

This gain is calculated relative to the corresponding results in classical "simulcast": therefore in HP +micro, the gain is calculated relative to the HP +micro situation in classical "simulcast", and therefore there is a gain relative to the headphone output.

Therefore, the results obtained vary depending on how well the receiver passband is filtered, but in all cases they are significantly better than is possible with the classical solution. These are the results obtained from a first filter experiment and significant optimization of the equivalent degradation and improvements to the SNR can still be expected (1 dB less in END; and 1 to 3 dB in SNR depending on the receiver).

Furthermore, for identical measured SNR values, noise with DRM pre-filtering according to the invention subjectively appears to be less of a nuisance because it gives an impression more particularly of hiss in reception (since noise tends to be whitened, in other words the amplitude—frequency response becomes more uniform), than crackling obtained with the classical solution that immediately suggests the presence of a interference source.

Although the present invention has been described with reference to preferred embodiments, workers skilled in the art will recognize that changes may be made in form and detail without departing from the scope of the invention.

The invention claimed is:

1. Radio broadcasting method for a first multicarrier digital signal occupying a first frequency band adjacent to and not overlapping at least one second frequency band, each of the at least one second frequency band being allocated for a second signal, wherein the first and second signals at least partly carry a same source signal, the method comprising:
   applying a pre-filtering to said first signal before it is emitted, so as to attenuate the power of said first signal in at least a first portion of said first frequency band adjacent to said at least one second frequency band, and to increase the power of said first signal in a second portion of said first frequency band, far from said at least one second frequency band; and
   transmitting simultaneously the first and second signals with at least one radio broadcasting emitter, wherein the first signal occupies a single continuous band of frequencies within the first frequency band and does not occupy the at least one second frequency band at transmission.

2. Radio broadcasting method according to claim 1, wherein said or at least one of said second signals is an analogue radio broadcasting signal.

3. Radio broadcasting method according to claim 2, wherein said or at least one of said second signals is an amplitude modulated signal.

4. Radio broadcasting method according to claim 1, wherein said pre-filtering comprises increasing the power of said first signal in the second portion of said first frequency band by a number of decibels that is at least as great as a number of decibels at which the power of said first signal is attenuated in the first portion of said first frequency band.

5. Radio broadcasting method according to any claim 1, wherein said pre-filtering is programmable.

6. Radio broadcasting method according to claim 5, wherein the programming of said pre-filtering applies to at least one of the following elements:
   filter cut-off frequency;
   power assigned to each portion of the first frequency band;
   shape of the filter template;
   filter slope in the attenuation zone(s) (roll-off).

7. Radio broadcasting method according to claim 5, wherein the programming of said pre-filtering takes account of at least one of the following items of information:
   frequency band;
   characteristics of the adjacent signal(s);
   particular characteristics of an emitter;
   particular characteristics of the transmission channel;
   changes to existing receivers in time.

8. Radio broadcasting method according to claim 1, wherein said pre-filtering comprises a filter template, which comprises progressive transitions.

9. Radio broadcasting method according to claim 1, wherein said pre-filtering is a weighting selectively applied to each of the carrier frequencies of said multicarrier signal, before application of a mathematical transformation.

10. Radio broadcasting method according to claim 9, wherein said weighting takes account of weighting coefficients stored in an allocation table.

11. Radio broadcasting method according to claim 1, wherein said pre-filtering is applied to time components I and Q of said multicarrier signal after application of a mathematical transformation.

12. Radio broadcasting method according to claim 11, wherein said pre-filtering is done by a digital filter with a linear phase comprising four elementary sub-filters.

13. Radio broadcasting method according to claim 1, wherein said first signal and said second signal simulcast identical programs.

14. Radio broadcasting method according to claim 1, wherein:
   the second signal comprises an amplitude modulated signal that is simulcast with the first, digital signal.

15. Radio broadcasting emitter for a first multicarrier digital signal occupying a first frequency band adjacent to and not overlapping at least one second frequency band, each of the at least one second frequency band being assigned to a second signal, wherein the first and second signals at least partly carry a same source signal the emitter comprising:
   pre-filtering means of said first signal before its emission, so as to attenuate the power of said first signal in at least a first portion of said first frequency band, adjacent to said at least one distinct second frequency band, and to increase the power of said first signal in a second portion of said first frequency band, far from said at least one second frequency band, wherein the first signal occupies a single continuous band of frequencies within the first frequency band and does not occupy the at least one second frequency band at transmission; and
   a transmitter adapted to transmit the first and second signals simultaneously.

16. A method comprising:
   generating a first radio broadcast multicarrier digital signal occupying a first frequency band adjacent to and not overlapping at least one distinct second frequency band assigned to a second, amplitude modulated signal that is simulcast with the first signal, wherein the first and second signals at least partly carry a same source signal, and wherein the first signal is pre-filtered so as to attenuate the power of said first signal in at least a first portion of said first frequency band, adjacent to said at least one second frequency band and to increase the power of said first signal in a second portion of said first frequency band, far from said at least one second frequency band, wherein the first signal occupies a single continuous band of frequencies within the first frequency band and does not occupy the at least one second frequency band at transmission; and
   transmitting simultaneously the first signal and the second signal with at least one radio broadcasting emitter.

17. A radio broadcasting method for a first multicarrier digital signal occupying a first frequency band adjacent to at least one second frequency band, each second frequency band allocated for a second signal, the method comprising:
   applying a pre-filtering to said first signal before said first signal is emitted, so as to attenuate the power of said first signal in at least a first portion of said first frequency band adjacent to said at least one second frequency band, and to increase the power of said first signal in a second portion of said first frequency band, far from said at least one second frequency band;
   wherein the step of applying a pre-filtering to said first signal conforms with a function H(f), wherein:

$H(f)$:

$-4.5 \text{ kHz} < f < 2.25 \text{ kHz}, \quad H(f) = 0 \text{ dB}$ $2.25 \text{ kHz} < f < 3.0 \text{ kHz}, \quad H(f) = -12 \cdot \dfrac{1 - \cos\left(\dfrac{f - 2.25}{1.5}\pi\right)}{2} \text{ dB}$ $$3.0 \text{ kHz} < f < 4.5 \text{ kHz}, \quad H(f) = -6 + 12\frac{3}{1.5} \cdot \frac{1 - \cos\left(\frac{f-1.5}{3}\right)}{2} \text{dB}$$

where f is the frequency of the first signal.

18. Radio broadcasting method according to claim 17, wherein:
the pre-filtering is applied so as to attenuate the power of said first signal in a third portion of said first frequency band adjacent to a third frequency band, which is opposite to said second frequency band relative to said first frequency band, such that interference between the first signal and a third signal in said third frequency band is reduced.

19. The method according to claim 16, wherein said first, digital signal and said second, amplitude modulated signal simulcast identical programs.

* * * * *

UNITED STATES PATENT AND TRADEMARK OFFICE
CERTIFICATE OF CORRECTION

PATENT NO.      : 7,991,075 B2                                    Page 1 of 2
APPLICATION NO. : 10/558055
DATED           : August 2, 2011
INVENTOR(S)     : Marc Lanoiselee et al.

It is certified that error appears in the above-identified patent and that said Letters Patent is hereby corrected as shown below:

In The Specification

In column 7, lines 45–54, delete $$H(f): -4.5 < f < 2.25 \, H(f) = 0 \text{ dB}$$

$$2.25 < f < 3.0 \, H(f) = -12 \cdot \frac{1 - \cos\left(\frac{f - 2.25}{1.5}\pi\right)}{2} \text{ dB}$$

"$3.0 < f < 4.5 \, H(f) = -6 + 12\frac{3}{1.5} \cdot \frac{1 - \cos\left(\frac{f - 1.5}{3}\pi\right)}{2} \text{ dB}$"

and insert $H(f)$:

$-4.5 \text{ kHz} < f < 2.25$, $H(f) = 0 \text{ dB}$ $2.25 \text{ kHz} < f < 3.0$, $H(f) = -12 \cdot \dfrac{1 - \cos\left(\dfrac{f - 2.25}{1.5}\pi\right)}{2} \text{ dB}$ $3.0 \text{ kHz} < f < 4.5$, $H(f) = -6 + 12\dfrac{3}{1.5} \cdot \dfrac{1 - \cos\left(\dfrac{f - 1.5}{3}\pi\right)}{2} \text{ dB}$

--                                                                      --.

Signed and Sealed this
Fifth Day of April, 2016

*Michelle K. Lee*

Michelle K. Lee
*Director of the United States Patent and Trademark Office*

In The Claims

In claim 17, column 11, lines 1–5, delete

" $3.0 \text{ kHz} < f < 4.5 \text{ kHz}, \quad H(f) = -6 + 12\dfrac{3}{1.5} \cdot \dfrac{1-\cos\left(\dfrac{f-1.5}{3}\right)}{2} \text{dB}$ , and insert -- $3.0 \text{ kHz} < f < 4.5 \text{ kHz}, \quad H(f) = -6 + 12\dfrac{3}{1.5} \cdot \dfrac{1-\cos\left(\dfrac{f-1.5}{3}\pi\right)}{2} \text{ dB}$ --.